Dec. 26, 1922.
C. L. HUSTON.
ROLLING MILL.
FILED APR. 22, 1920.
1,440,221.
2 SHEETS—SHEET 1.
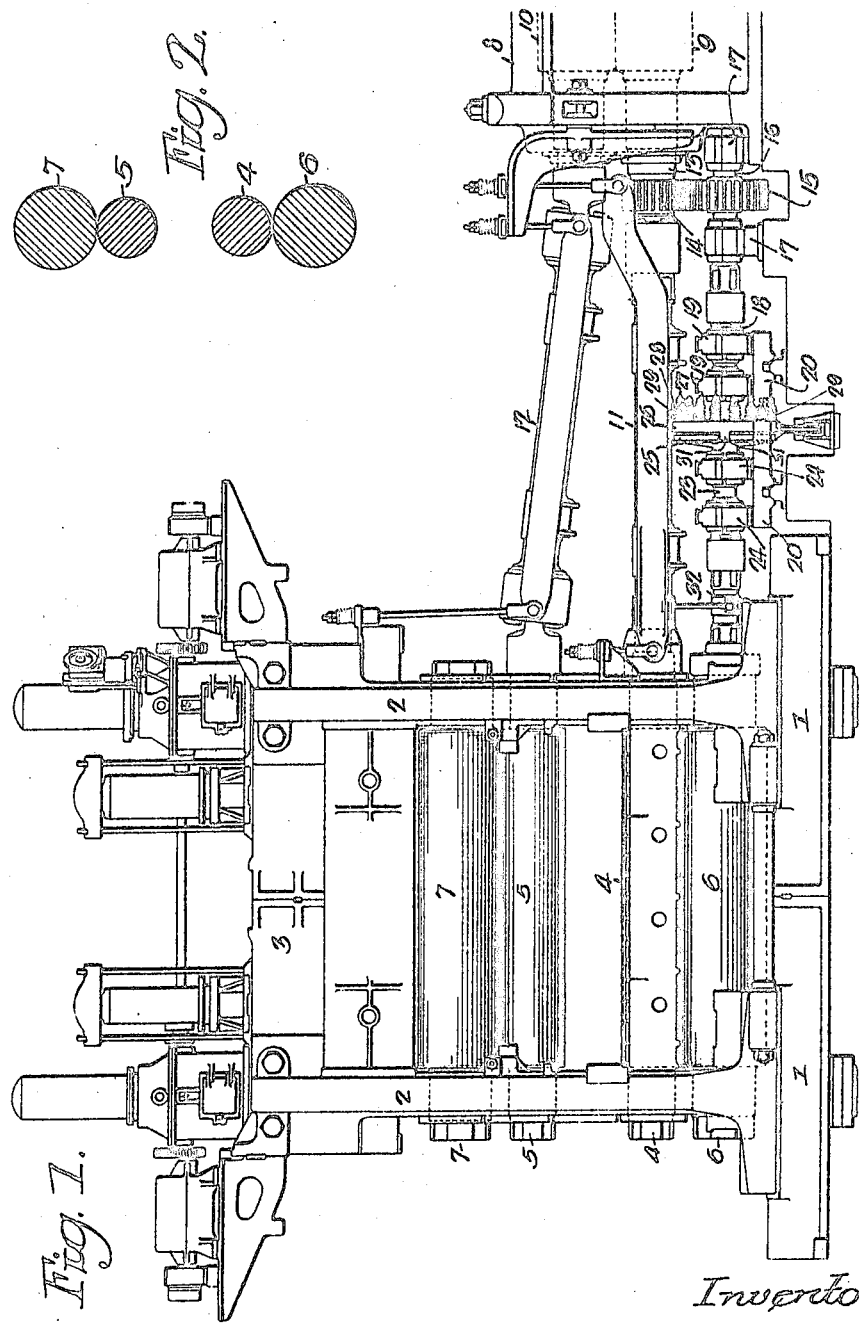
Inventor.—
Charles L. Huston,
by his Attorneys:—

Dec. 26, 1922.
C. L. HUSTON.
ROLLING MILL.
FILED APR. 22, 1920.
1,440,221.
2 SHEETS—SHEET 2.
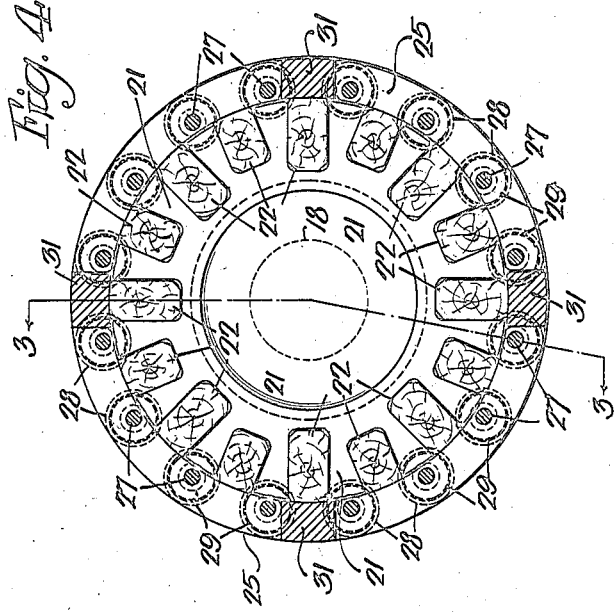
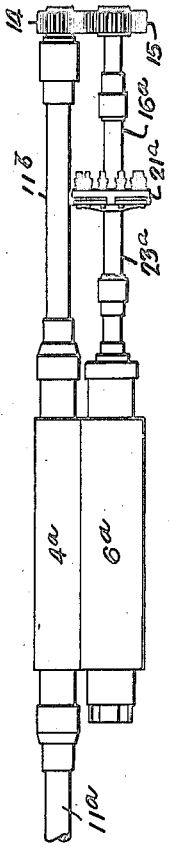
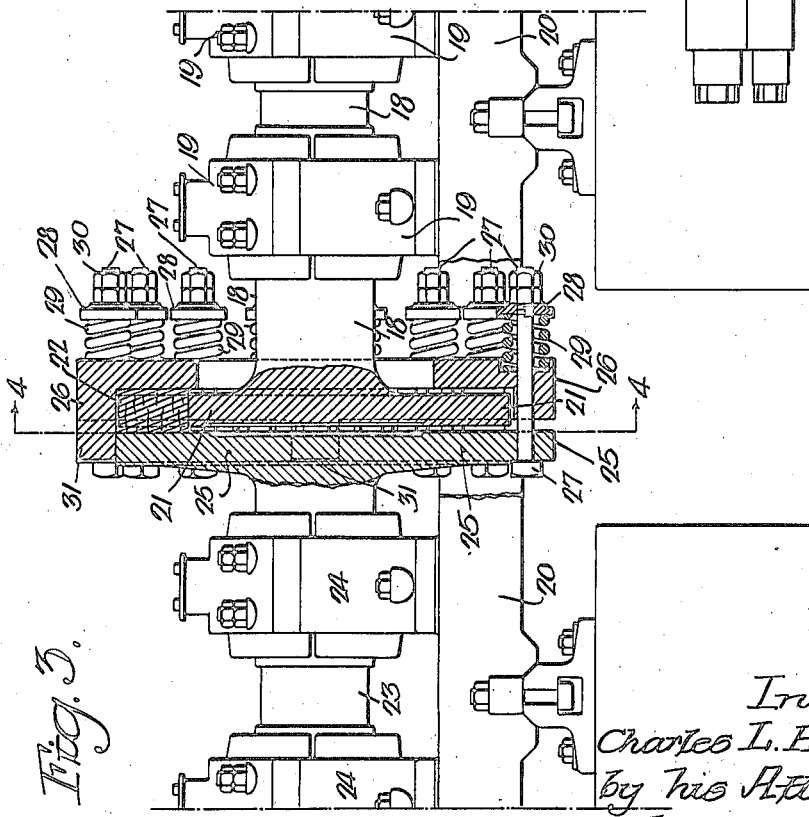
Inventor:-
Charles L. Huston.
by his Attorneys:
Howen & Howen Patented Dec. 26, 1922.

1,440,221

UNITED STATES PATENT OFFICE.

CHARLES L. HUSTON, OF COATESVILLE, PENNSYLVANIA.

ROLLING MILL.

Application filed April 22, 1920. Serial No. 375,685.

*To all whom it may concern:*

Be it known that I, CHARLES L. HUSTON, a citizen of the United States, residing in Coatesville, Pennsylvania, have invented certain Improvements in Rolling Mills, of which the following is a specification.

My invention relates to certain improvements in rolling mills of the type in which a supporting roll is located back of the working roll of a rolling mill. In the drawings, I have illustrated my invention as applied to a four-high mill. I find that in existing mills of this type, the lower supporting roll is not sufficiently driven, owing to the comparatively light weight of the working roll, which does not transmit sufficient power through its surface contact with the lower supporting roll, especially when the motor is being reversed.

The object of my invention is to provide means for driving this lower supporting roll through friction mechanism from the driving gear of a rolling mill.

In the accompanying drawings:

Fig. 1 is a view, in elevation, showing one type of rolling mill with the driving mechanism and illustrating my invention;

Fig. 2 is a diagrammatic sectional view of the rolls;

Fig. 3 is a side view, partly in section, illustrating the friction drive, the section being on the line 3—3, Fig. 4;

Fig. 4 is a sectional view on the line 4—4, Fig. 3; and

Fig. 5 is a view showing a different arrangement of the roll driving means.

1 is the base of the rolling mill. 2 are the housings. 3 is the upper bridge frame. 4 is the lower working roll. 5 is the upper working roll. 6 is the lower supporting roll and 7 is the upper supporting roll. 8 is the gear stand and 9 and 10 are the two gear wheels shown by dotted lines in Fig. 1 for driving the two connecting shafts 11 and 12. The shaft 11 is coupled to one end of the lower working roll 4 and the shaft 12 is coupled to one end of the working roll 5. This upper working roll, and its supporting roll 7, can be raised and lowered by the ordinary mechanism. On the trunnion 13 of the gear wheel 9 is a gear wheel 14, which meshes with a gear wheel 15 on a shaft 16 adapted to bearings 17. The shaft 16 is coupled to a shaft 18 adapted to bearings 19 on a frame 20 and on this shaft 18, as shown in Fig. 3, is a disk 21 having a series of friction blocks 22 arranged around its periphery, and made of wood in the present instance, indicated in Fig. 4.

23 is a shaft on the opposite end of the frame 20 adapted to bearings 24. On this shaft is a disk 25. A ring 26 is coupled to this disk by a series of bolts 27 having caps 28 and between these caps and the ring are springs 29. The nuts 30 on the bolts can be adjusted so as to increase or diminish the pressure of the springs. The disk 25 bears against one face of the blocks 22, while the ring 26 bears against the opposite face. The ring has projections 31, which extend into recesses in the disk 25 so as to take the driving strain off of the bolts 27 in order that the shaft 23 may be driven from the shaft 18 through the friction coupling.

The shaft 23 is coupled to a shaft 32 which is, in turn, coupled to a trunnion of the lower supporting roll, as clearly shown in Fig. 1. Thus, the roll 6 is driven from the gear in the gear stand 8 through a friction coupling so that the turning of the lower supporting roll is not dependent entirely upon the lower working roll.

By this construction, the uneven wearing of the rolls 4 and 6 and the consequent change in proportion in diameter of said rolls as compared with the proportions of the driving gears 14 and 15 is obviated to a certain extent and the risk of breakage of the mechanism propelling roll 6 is avoided and the proper driving of said roll is assured.

In Fig. 5, I have illustrated a construction in which the lower driving roll $4^a$ is driven from a power shaft $11^a$ at one side and the roll is coupled to a shaft $11^b$ geared to a shaft $16^a$, which drives a shaft $23^a$ through a friction coupling $21^a$ and the shaft $23^a$ is coupled to the lower supporting roll $6^a$. Other modifications of the driving mechanism of the roll may be made without departing from the essential features of the invention.

I claim:

1. The combination in a rolling mill, of a working roll; a supporting roll therefor; means for driving the working roll; and means including a frictional coupling through which the supporting roll is driven with the working roll.

2. The combination in a rolling mill, of a lower working roll; a supporting roll therefor; a gear stand; means for positively driving the lower working roll from the gear stand; and friction mechanism through which the supporting roll is driven from said stand.

3. The combination in a four-high rolling mill, of a lower working roll; a supporting roll therefor; a gear stand; gear wheels therein for positively driving the upper and lower working rolls; a trunnion extending from the gear wheel driving the lower working roll; a gear on said trunnion; a shaft having a gear wheel meshing with the last mentioned gear wheel; friction mechanism made in two parts, one part being secured to said shaft; and a second shaft coupled to the lower supporting roll of the mill and carrying the other part of the friction mechanism.

4. The combination in a four-high rolling mill, of a lower working roll; a supporting roll therefor; a gear stand; gear wheels therein for positively driving the upper and lower working rolls; a trunnion extending from the lower gear wheel; a shaft; a gear thereon; a gear on the trunnion with which the last mentioned gear meshes; a disk on the shaft; friction blocks on the disk; a second shaft in line with the first shaft and having a disk thereon; a ring on the opposite side of the first mentioned disk from the other disk; a series of bolts coupling the ring to the last mentioned disk; and springs on the bolts for holding the parts in frictional engagement, the last mentioned shaft being coupled to the lower supporting roll of the mill.

CHARLES L. HUSTON.